United States Patent [19]

Snow

[11] Patent Number: 4,944,847
[45] Date of Patent: Jul. 31, 1990

[54] METHOD FOR INHIBITING EPICHLOROHYDRIN FOULING

[75] Inventor: Karis W. Snow, Stafford, Tex.

[73] Assignee: Nalco Chemical Company, Naperville, Ill.

[21] Appl. No.: 364,736

[22] Filed: Jun. 12, 1989

[51] Int. Cl.$^5$ ............................................. B01D 3/34
[52] U.S. Cl. ............................................ 203/8; 203/28; 203/65; 203/66; 203/DIG. 6; 203/DIG. 23; 549/514; 549/541
[58] Field of Search ................... 203/7, 8, 65, 66, 28, 203/DIG. 6, 91, DIG. 23; 549/541, 542, 514; 568/847

[56] References Cited

U.S. PATENT DOCUMENTS

| | | | |
|---|---|---|---|
| 2,714,122 | 7/1955 | Smith et al. | 568/847 |
| 2,993,077 | 7/1961 | Trager | 568/847 |
| 3,799,949 | 3/1974 | Keller et al. | 549/525 |
| 4,050,993 | 9/1977 | Daniels | 203/9 |
| 4,061,545 | 12/1977 | Watson | 203/9 |
| 4,465,881 | 8/1984 | Miller et al. | 203/9 |

FOREIGN PATENT DOCUMENTS

| | | | |
|---|---|---|---|
| 0982976 | 2/1976 | Canada | 203/8 |
| 2541270 | 3/1976 | Fed. Rep. of Germany | 203/8 |
| 0072124 | 5/1980 | Japan | 203/9 |
| 784620 | 10/1957 | United Kingdom . | |

OTHER PUBLICATIONS

Khim. Prom. 49,824 (1973), A Continuous Method of Producing Epichlorhydrin, Kyasimov et al.
Kinet, Katal 17 (2), Mokrousva et al., 515 (1976).
L. A. Oshin et al: Neftekhimija (USSR), 15, 281 (1975).

*Primary Examiner*—Virginia Manoharan
*Attorney, Agent, or Firm*—Donald G. Epple; Anthony L. Cupoli

[57] ABSTRACT

A method of inhibiting fouling in distillation towers, overhead lines, reflux lines, and condensers operating in a process to manufacture and purify epichlorohydrin. This method resides in treating process streams entering or exiting such towers, lines and condensers, including feed streams, reflux streams, gaseous or liquid overhead streams, with an effective antifouling amount of a $C_3$–$C_9$ linear or branched alkyl substituted catechol, or mixtures thereof.

3 Claims, No Drawings

METHOD FOR INHIBITING EPICHLOROHYDRIN FOULING

Epichlorohydrin is manufactured by a number of processes. Primarily a commonly used process is one that reacts allychloride with chlorine water to give a mixture of isomeric glycerol chlorohydrins which in turn is dehydrochlorinated with an alkali material to form epichlorohydrin which is separated from process streams by steam stripping and purified by distillation. The processes to manufacture epichlorohydrin can also include chlorination of acrolein, followed by reduction of the product formed, i.e. 2, 3-dichloroproponaldehyde with secondary butyl alcohol using an aluminum secondary butoxide catalyst to yield glycerol beta, gamma-dichlorohydrin which is then dehydrochlorinated with lime to form epichlorohydrin.

Epichlorohydrin can also be prepared by the epoxidation of allylchloride with peracids, perborates, or by epoxidation with tertiarybutylhydroperoxide over various catalysts, such as vanadium, tungsten, molybdenum, and the like. Finally, patents have been issued to the formation of epichlorohydrin by oxidation of allychloride with air over a cobalt catalyst.

These various processes all require either steam distillation or a normal distillation to isolate and purify the final epichlorohydrin product. The above processes are summarized in the following literature and patents:
1. Japanese Patent 75 1,6341; Takakuwa, et al.
2. U.S. Pat. No. 2,714,122; Smith, et al.
3. U.S. Pat. No. 2,714,123; Johnson, et al.
4. German Patent 1,285,993; Berthold, et al.
5. U.S. Pat. No. 2,993,077; Trager
6. French Patent 1,412,886; Huels A. G.
7. French Patent 1,328,311; Brown
8. *Khim Prom.* 49,824 (1973)
9. U.S. Pat. No. 2,860,140; Furman, et al.
10. British Patent 784,620; Phillips, et al.
11. U.S. Pat. No. 3,799,949; Keller, et al.
12. German Patent Disclosure, OLS 1,942,557;
13. French Patent 1,447267; Bruenie, et al.
14. Japanese Patent 70 17,645; Sakan, et al.
15. L. A. Oshin, et al; *Neftekhimija (USSR)*,15, 281 (1975)
16. Mokrousva, et al; *Kinet. Katal* 17(2), 515 (1976)

References have been obtained from the bibliography appearing in the Kirk-Othmer Encyclopedia of Chemical Technology, Third Edition, Vol. 5, Pages 862–864, which is incorporated herein by reference.

Each of the processes above yields a product in admixture with by-products, or in admixture with various reactants and/or solvents, including water, which solvents may be used to help isolate the product from the reactants. In addition, the epichlorohydrin product can be stripped from these various solvents, primarily by either steam distillation followed by normal distillation or by other techniques which would be capable of yielding a pure epichlorohydrin stream. In any of these processes, epichlorohydrin or its by-products can collect in various parts of the distillation towers and can undergo reaction in these distillation towers to provide for products, such as polymers, which foul the upper trays of these distillation towers or columns and also foul overhead lines and condensers. The fouling is primarily based upon polymerization of the by-products present in the epichlorohydrin stream. This polymerization needs to be inhibited in the distillation units so as to provide a clean system free of polymers which foul the upper trays, overhead lines and condensers, used to isolate and purify epichlorohydrin for final use and/or sale.

A material presently being used for the purpose of inhibiting this fouling in epichlorohydrin units, distillation towers, overhead lines and condensers, is a material normally referred to as 2,6-ditertiary butyl-4-methyl phenol, 2,6-di-tertbutylphenol or mixtures of similar so-called hindered phenols. These hindered phenols are presently sold under three commercial names, Ionol, Ethyl 733 and Uvinox anti-oxidants. Ionol anti-oxidants are commercial products made available by Shell Chemical Company, which products contain a mixture of various hindered phenols as described above; and Uvinox anti-oxidant is made available by GAF Corporation and is also primarily the 2,6-ditertiary butyl substituted hindered phenols mentioned above.

It is an object of this invention to provide for improved inhibition of fouling occurring in the upper trays of the light ends column and in the overhead lines in condensers in a process which purifies, isolates and manufactures epichlorohydrin.

THE INVENTION

Therefore, I have discovered a method of inhibiting fouling in distillation towers, overhead lines, reflux lines and condensers operating in a process to manufacture and purify epichlorohydrin. This method comprises treating the process streams exiting or entering said towers, lines and condensers, including feed streams, reflux streams, and gaseous or liquid overhead streams, either simultaneously or singly, which process streams contain epichlorohydrin, various contaminants and other by-products, with an effective antifouling amount of a $C_3$–$C_9$ linear or branched alkyl substituted catechol, most preferably 4-tertiarybutylcatechol.

In the preferred method of may invention, the preferred substituted catechol, 4-tertiarybutylcatechol, is dissolved in a liquid alcoholic solvent chosen from the group consisting of $C_1$–$C_6$ alcohols and $C_1$–$C_6$ chlorinated alcohols to form an alcoholic solution of the 4-tertiarybutylcatechol; and the alcoholic catechol solution so formed is added to the process streams to the distillation towers, reflux or overhead lines, and/or sprayed into the gaseous distillation tower overheads so that at least 25 ppm, preferably at least 100 ppm, and most preferably at least 250 ppm of 4-tertiarybutylcatechol, based on the total volume of the process stream being treated, is present in these process streams so treated. The process streams include, but are not necessarily limited to, distillation tower feed streams, reflux streams, overhead liquid or gaseous streams, and the like.

THE ALCOHOLS

Preferably the 4-tertiarybutylcatechol which is found to be a superior antifoulant is dissolved in alcohols or other polar organic solvents to form a liquid alcoholic solution. The alcohols to be used may be chosen from the group consisting of methanol, ethanol, propanol or isopropanol, butanol, isobutanol or tertiary butanol and such other $C_5$ and $C_6$ alcohols which can form liquid alcoholic solvents and solutions with 4-tertiarybutylcatechol. In addition to these normal alkyl and branched alkyl alcohols, other alcohols such as glycol and the liquid oligomeric ethylene oxide and propylene oxide alcohols may also be used. Finally, reasonable chlorinated alcohols which may be isolated from epichlorohydrin processing, or may be used as raw materials to epichlorohydrin processing, may also be used as solvents for the the 4-tertiarybutylcatechol. These alcohols include the chlorinated alcohols such as alpha monochlorohydrin, beta monochlorohydrin, alpha gamma dichlorohydrin, alpha, beta dichlorohydrin, glycerol monochlorohydrin, 1-chloro-2-propanol, 2-chloro-1-propanol, 3-chloro-1-propanol, and the like. These chlorinated alcohols generally contain from 1-6 carbon atoms and at least one chlorine atom along with at least one alcohol functional group. However, it is most preferred that the alcohol chosen can be stripped from process streams in the overhead of the steam distillation towers operating in the process for manufacture of epichlorohydrin.

In addition to the alcoholic solvents mentioned above, other polar organic solvents may also be used, such as acetone, methyl ethyl ketone, tetrahydrofuran, and the like. The only requirement for the polar solvent is that it dissolved sufficient amounts of 4-tertiarybutylcatechol so that its addition to the feed stream does not cause any difficulties in obtaining relatively pure epichlorohydrin from the operations to which these materials are added.

THE 4-TERTIARY BUTYL CATECHOL

The most preferred antifoulant used in this invention is 4-tertiarybutylcatechol. However, we anticipate that other branched or linear $C_3$-$C_9$ alkyl substituted catechols, or mixtures thereof with 4-tertiarybutylcatechol may also be used effectively in this invention.

THE EFFECTIVE ANTIFOULING AMOUNT

By the term "effective antifouling amount", we mean that amount of 4-tertiarybutylcatechol needed to prevent or inhibit fouling, decrease pressure build-up, or prevent pressure build-up, and which amount must be present in the process, feed and/or overhead streams containing epichlorohydrin, which process streams enter or exit various distillation units and towers, reflux lines, overhead lines and/or condensers operating in the manufacture and purification of epichlorohydrin. Normally, this effective antifouling amount to be present in these process streams are calculated on a volume/volume or weight volume basis, and is at least 25 ppm of 4-tertiarybutylcatechol, preferably at least 100 ppm of 4-tertiarybutylcatechol, and most preferably at least 250 ppm of 4-tertiarybutylcatechol. It is common to treat these distillation process, feed and/or overhead streams with from about 25 to about 250 ppm (volume/volume) of a methanol solution with contains from 50-90 percent by weight of the $C_3$-$C_9$ alkyl substituted catechol, and preferably contains from about 7.0-87.5 percent of the preferred 4-tertiarybutylcatechol.

EXAMPLES

To exemplify our invention, the various fouling tests are provided in Tables 1 and 2 below.

Table 1 describes the results of using our 4-tertiarybutylcatechol materials in a modified test procedure derived from a test procedure outlined as ASTM D-873-74, a procedure to measure oxidation stability of aviation fuels. These modified test conditions include the following:

EXAMPLE 1

The results obtained from the operation of the unit described in ASTM D-873-74, as modified, at 100° C. under either 100 psig $O_2$ or $N_2$ pressure and for various time periods. The gum solvent used was made up of an equal volume mixture of toluene, acetone, and methanol. The stream tested was obtained from an operational tower in an epichlorohydrin manufacturing plant and identified as an overhead "light ends" from the purification unit. The analytical description for this so-called "light ends" stream is presented as Table 3 below. However, one would expect some variation in both type and amount of ingredients in these type of process streams, depending on the process from which the sample is obtained. The bleed-off and recharge procedure of the ASTM method above is not used, and the aging period is chosen (about 4 hours) to yield sufficient gum or foulant to measure the performance of the antifoulant. No effort is made to measure insoluble vs. soluble or precipitated gums. The sample from the bomb is simply emptied into a glass beaker, jet evaporated and weighed.

TABLE 1

| EPICHLOROHYDRIN LIGHT ENDS COLUMN POLYMERIZATION STUDY MODIFIED ASTM D-873 TEST RESULTS TEST CONDITIONS: 100° C., 100 psig $O_2$, 4 hours | | | |
|---|---|---|---|
| CHEMICAL | DOSAGE(ppm) | GUM WEIGHT(g/25 ml) | % INHIBITION |
| BLANK | — | 6.50 | — |
| TREATMENT A | 500 | 0.25 | 96.1 |
| TREATMEMT A | 1000 | 0.25 | 96.1 |
| TREATMENT B | 500 | 6.50 | 0.0 |
| TREATMENT B | 1000 | 5.89 | 9.4 |

In Table 1, Treatment A is an 85% (by wt.) solution of 4-tertiarybutylcatechol in methanol. The dosage is based on the total methanolic solution. Also in Table 1, Treatment B is a material obtained by purchase of a product described as "Uvinox 1494", a product of GAF Corporation which is a mixture of the hindered phenols described above, which mixture does not contain measurable amounts of 4-tertiarybutylcatechol. This hindered phenol mixture, or mixtures similar to this material, are used commerically in present day epichlorohydrin manufacturing plants to inhibit fouling in distillation towers contained therein.

Gum weights are measured after the test is completed and the % inhibition is calculated as compared to the gum weight observed with a blank material untreated by any form of an antifoulant material.

As one can see, the 4-tertiarybutylcatechol materials of this invention far outperform the materials used in the art as antifoulants.

EXAMPLE 2

A similar test again following the modified ASTM D-873-74 test outlined above, this time calling for test conditions at 100° C., 100 psig N$_2$, for a 16 hour time were also conducted with the materials previously tested. The results are presented in Table 2 below:

TABLE 2
EPICHLOROHYDRIN LIGHT ENDS COLUMN
POLYMERIZATION STUDY
MODIFIED ASTM D-873 TEST RESULTS
TEST CONDITIONS: 100° C., 100 psig N$_2$, 16 Hours

| CHEMICAL | DOSAGE(ppm) | GUM WEIGHT(g/25 ml) | INHIBITION |
| --- | --- | --- | --- |
| BLANK | — | 1.31 | — |
| TREATMENT A | 500 | 0.79 | 39.7 |
| TREATMENT A | 1000 | 0.53 | 60.0 |
| TREATMENT B | 500 | 0.95 | 27.5 |
| TREATMENT B | 1000 | 0.81 | 38.2 |

TABLE 3
OVERHEAD "LIGHT ENDS" COMPOSITION

| INGREDIENTS | WEIGHT |
| --- | --- |
| Epichlorohydrin | 20–25% |
| Allyl Chloride | 18–22% |
| Dichloropropene | 10–15% |
| Saturated and Unsaturated chlorinated hydrocarbons | Remainder |

Again, in Table 2, Treatments A & B are the same as described in Example 1 above. Under this set of conditions, the treatment A containing the 4-tertiarybutylcatechol materials of our instant invention again outperform the materials used in the art currently as antifoulants for this purpose. The improvement is such that at least a 30% improvement, and in some cases nearly a 100% improvement are observed under these nitrogen pressurized bomb test conditions.

The 4-tertiarybutylcatechol materials useful in the invention include all forms and/or solutions of 4-tertiarybutylcatechol and any mixtures thereof with other alkyl substituted catechol compounds. When mixtures are used, it is preferred that the mixture contain a predominant, i.e. at least a major portion or percentage of 4-tertiarybutylcatechol.

Having described my invention, I claim:

1. A method of inhibiting fouling in distillation towers, overhead lines, reflux lines, and condensers operating in a process to manufacture and purify epichlorohydrin which method comprises treating process streams containing epichlorohydrin entering or exiting said towers, lines and condensers, including feed streams, reflux streams, gaseous or liquid overhead streams, with an effective antifouling amount of a C$_3$-C$_9$ linear or branched alkyl substituted catechol containing a major portion or percentage of 4-tertiary butyl catechol, or mixtures thereof, which linear or branched alkyl substituted catechols are dissolved in a liquid alcoholic solvent chosen from the group consisting of C$_1$-C$_6$ alcohols, C$_1$-C$_6$ chlorinated alcohols, and mixtures thereof.

2. The method of claim 1 wherein the alkyl substituted catechol is dissolved in the liquid alcoholic solvent to form an alcoholic catechol solution and the alcoholic catechol solution so formed is added to the process streams at at least 25 ppm alcoholic catechol solution, based on volume of process streams so treated.

3. The method of claim 2 wherein the process stream is treated to contain at least 250 ppm 4-tertiarybutylcatechol, based on the volume of process streams so treated, and wherein the liquid alcoholic solvent is methanol.

* * * * *